United States Patent
Sakuma et al.

(10) Patent No.: US 12,546,933 B2
(45) Date of Patent: Feb. 10, 2026

(54) MULTICORE OPTICAL FIBER

(71) Applicant: SUMITOMO ELECTRIC INDUSTRIES, LTD., Osaka (JP)

(72) Inventors: Hirotaka Sakuma, Osaka (JP); Takahiro Suganuma, Osaka (JP); Tetsuya Hayashi, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 388 days.

(21) Appl. No.: 18/029,169

(22) PCT Filed: Nov. 2, 2021

(86) PCT No.: PCT/JP2021/040389
§ 371 (c)(1),
(2) Date: Mar. 29, 2023

(87) PCT Pub. No.: WO2022/097639
PCT Pub. Date: May 12, 2022

(65) Prior Publication Data
US 2023/0288631 A1    Sep. 14, 2023

(30) Foreign Application Priority Data
Nov. 4, 2020    (JP) ................. 2020-184275

(51) Int. Cl.
*G02B 6/02*    (2006.01)
*G02B 6/028*    (2006.01)

(52) U.S. Cl.
CPC ..... *G02B 6/02042* (2013.01); *G02B 6/02395* (2013.01); *G02B 6/028* (2013.01)

(58) Field of Classification Search
CPC ............ G02B 6/02042; G02B 6/02004; G02B 6/02328
See application file for complete search history.

(56) References Cited

U.S. PATENT DOCUMENTS

| 7,489,850 B1 | 2/2009 | Berkey |
| 9,052,433 B2 | 6/2015 | Dianov et al. |

(Continued)

FOREIGN PATENT DOCUMENTS

| JP | 2011-170062 A | 9/2011 |
| JP | 2013-088457 A | 5/2013 |

(Continued)

OTHER PUBLICATIONS

Koshiba, Masanori et al., "Multi-core fiber design and analysis: coupled-mode theory and coupled-power theory," Optics Express, vol. 19, No. 26, B102, 2011.

(Continued)

*Primary Examiner* — Eric Wong
(74) *Attorney, Agent, or Firm* — Faegre Drinker Biddle & Reath LLP

(57) ABSTRACT

An MCF includes a plurality of cores each extending in a direction along a central axis and a cladding covering each of the plurality of cores. The cladding includes a low refractive index barrier. The low refractive index barrier includes an alkali metal element. A relative refractive index of the low refractive index barrier is lower than an average value of a relative refractive indices of the cladding overall. The core interval is set such that a total sum of the power coupling coefficients between a specific core among the plurality of cores and each of all remaining cores is 2.3× $10^{-4}$/km or less.

18 Claims, 7 Drawing Sheets

(56) References Cited

U.S. PATENT DOCUMENTS

| | | | |
|---|---|---|---|
| 2015/0139596 A1 | 5/2015 | Ishida et al. | |
| 2017/0261685 A1 | 9/2017 | Nakanishi et al. | |
| 2017/0321022 A1* | 11/2017 | Sano | B32B 15/06 |
| 2017/0351022 A1 | 12/2017 | Nakanishi et al. | |
| 2021/0063208 A1* | 3/2021 | Li | G01L 1/242 |
| 2022/0043201 A1* | 2/2022 | Bickham | G02B 6/02042 |
| 2023/0167002 A1* | 6/2023 | Christie | G02B 6/02395 65/397 |

FOREIGN PATENT DOCUMENTS

| | | |
|---|---|---|
| JP | 2015-099210 A | 5/2015 |
| JP | 2017-161705 A | 9/2017 |
| JP | 2019-081681 A | 5/2019 |
| JP | 2020-037503 A | 3/2020 |
| WO | WO-2016/152507 A1 | 9/2016 |

OTHER PUBLICATIONS

Nozoe, Saki et al., "Low Crosstalk125 μm-Cladding Multi-Core Fiber with Limited Air-Holes Fabricated with Over-Cladding Bundled Rods Technique," OFC 2017, Th1H.6, 2017.

* cited by examiner

MULTICORE OPTICAL FIBER

TECHNICAL FIELD

The present disclosure relates to a multicore optical (hereinafter referred to as an MCF). This application claims priority based on Japanese Patent Application No. 2020-184275 filed on Nov. 4, 2020, the entire contents of which are incorporated herein by reference.

BACKGROUND ART

Optical fibers used for long-distance transmission, such as submarine cables, are required to reduce transmission loss. Patent Literatures 1 and 2 disclose a technique of doping an alkali metal element to a part of the core and cladding of an MCF in order to suppress transmission loss.

In the uncoupled MCF, when the inter-core distance is short, inter-core crosstalk (hereinafter, referred to as XT) which is interference of a mode propagating through each core increases. On the other hand, when the inter-core distance is long, the number of cores that can be accommodated in an optical fiber having the same diameter decreases. Non-Patent Literature 1 describes a technique of providing a region having a low refractive index between cores in order to suppress inter-core XT.

CITATION LIST

Patent Literature

[Non-Patent Literature 1] International Publication No. 2016/152507
[Non-Patent Literature 2] Japanese Patent Application Laid-Open No. 2017-161705.

Non-Patent Literature

[Non-Patent Literature 1] Saki Nozoe, et al., "Low Crosstalk 125 µm-Cladding Multi-Core Fiber with Limited Air-Holes Fabricated with Over-Cladding Bundled Rods Technique", OFC 2017, Th1H. 6
[Non-Patent Literature 2] Masanori Koshiba, et al., "Multi-core fiber design and analysis: coupled-mode theory and coupled-power theory", OPTICS EXPRESS, Vol. 19, No. 26, B102

SUMMARY OF INVENTION

An MCF of the present disclosure is an MCF that includes a plurality of cores each extending in a direction along a central axis and a cladding covering each of the plurality of cores. The cladding includes a low refractive index barrier. The low refractive index barrier includes an alkali metal element. A relative refractive index of the low refractive index barrier is lower than an average value of relative refractive indices of the cladding overall. The core interval is set such that a total sum of the power coupling coefficients between a specific core among the plurality of cores and each of all remaining cores is $2.3 \times 10^{-4}$/km or less.

DESCRIPTION OF EMBODIMENTS

Figure 1:
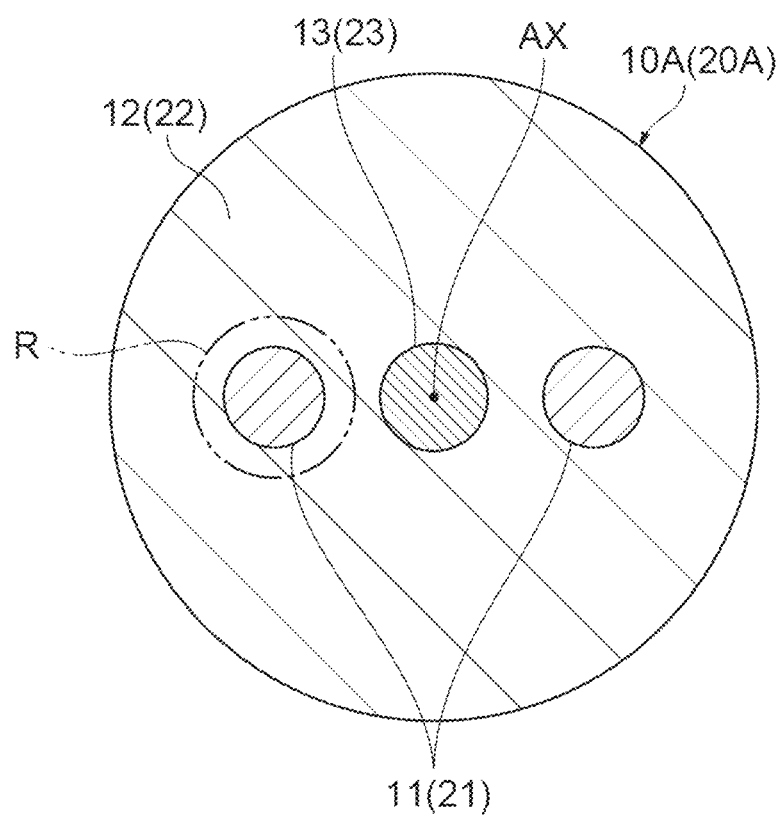
FIG. 1 is a diagram showing a cross-sectional structure of an MCF according to an embodiment and a cross-sectional structure of a preform for manufacturing the MCF.

Problems to be Solved by the Present Disclosure

In the uncoupled MCF, it may be difficult to achieve both reduction of the inter-core XT and reduction of the transmission loss only by doping an alkali metal element to a part of the core and cladding and providing a region having a low refractive index between the cores.

An object of the present disclosure is to provide an uncoupled MCF capable of achieving both reduction in inter-core XT and reduction in transmission loss.

Effects of the Present Disclosure

According to the present disclosure, an uncoupled MCF capable of achieving both reduction in inter-core XT and reduction in transmission loss is provided.

Description of Embodiments of the Present Disclosure

Embodiments of the present disclosure are first listed and described. An MCF according to an embodiment is an MCF that includes a plurality of cores each extending in a direction along a central axis and a cladding covering each of the plurality of cores. The cladding includes a low refractive index barrier. The low refractive index barrier includes an alkali metal element. A relative refractive index of the low refractive index barrier is lower than an average value of relative refractive indices of the cladding overall. The core interval is set such that a total sum of the power coupling coefficients between a specific core among the plurality of cores and each of all remaining cores is $2.3 \times 10^{-4}$/km or less.

In the low refractive index barrier, a difference in refractive index may occur due to a difference in fluorine concentration in comparison with the surrounding cladding. In this case, the difference in fluorine concentration causes a difference in viscosity between the low refractive index barrier and the surrounding cladding during drawing. Therefore, in the MCF obtained by drawing, a difference in residual stress occurs between the low refractive index barrier and the surrounding cladding due to the influence of the difference in viscosity. As a result, the transmission loss of the MCF increases. In the MCF according to the above embodiment, the low refractive index barrier includes an alkali metal element. The alkali metal element has an effect of reducing viscosity during drawing. Therefore, it is suppressed to form a residual stress difference due to a viscosity difference during drawing between the low refractive index barrier and the surrounding cladding. As a result, it is possible to achieve both reduction in inter-core XT and reduction in transmission loss. In the present specification, "relative refractive index" is a refractive index normalized by the refractive index of pure silica.

The low refractive index barrier may be provided at a position overlapping a center of the cladding in the cross section orthogonal to a direction along the central axis. In this case, the inter-core XT can be effectively reduced.

The low refractive index barrier may be provided at a position overlapping a line segment connecting centers of two cores adjacent to each other among the plurality of cores and not overlapping the two cores in a cross section orthogonal to a direction along the central axis. In this case, the inter-core XT can be effectively reduced.

When the cladding diameter is 125 µm, the core interval is preferably 50 µm or less. When the core interval is larger than 50 µm, it is difficult to accommodate a plurality of cores in one optical fiber while avoiding leakage of transmission light to the outside of the cladding.

The relative refractive index of the low refractive index barrier may be at least 0.05% lower than the average value of the relative refractive indices of the cladding overall. In this case, the inter-core XT can be effectively reduced.

The relative refractive index of the low refractive index barrier may be at least 0.2% lower than the average value of the relative refractive indices of the cladding overall. In this case, the inter-core XT can be reduced more effectively.

One or more cores of the plurality of cores may include an alkali metal element. In this case, when the optical fiber preform is spun, the viscosity of the core is reduced and rearrangement of the glass is promoted. Therefore, transmission loss caused by Rayleigh scattering is low.

An average mass fraction of alkali metal elements in the low refractive index barrier may be 0.2 ppm or more 500 ppm or less. By doping 0.2 ppm or more, the transmission loss can be significantly reduced as compared with the case where no alkali metal element is doped. On the other hand, if the concentration of the alkali metal element is higher than 500 ppm, poor crystallinity occurs at the stage of the preform, and the yield decreases. In the case of 0.2 ppm or more 500 ppm or less, transmission loss may be effectively reduced.

The low refractive index barrier may include at least one alkali metal element selected from the group consisting of lithium, sodium, potassium, and rubidium. In this case, the transmission loss can be effectively reduced.

Each of the plurality of cores may be made of $SiO_2$ glass in which a mass fraction of $GeO_2$ is 1% or less, the cladding may include fluorine, and a transmission loss of each of the plurality of cores at wavelength 1550 nm may be 0.18 dB/km or less. In this case, it is easy to achieve both reduction in inter-core XT and reduction in transmission loss.

DETAILED DESCRIPTION OF EMBODIMENTS OF THE PRESENT DISCLOSURE

Specific examples of MCF and MCF preform will be described below with reference to the drawings. It should be noted that the present invention is not limited to these examples, but is defined by the scope of claims and is intended to include all modifications within the meaning and scope equivalent to the scope of claims. In the description of the drawings, the same elements are denoted by the same reference numerals, and redundant description will be omitted.

FIG. 1 is a diagram showing a cross-sectional structure of an MCF 20A according to an embodiment and a cross-sectional structure of the preform 10A for manufacturing the MCF 20A. FIG. 1 shows a cross section of the preform 10A orthogonal to the central axis AX (hereinafter referred to as a "cross section of the preform 10A"). The direction of the central axis AX coincides with the longitudinal direction of the preform 10A. The preform 10A includes a plurality of core portions 11 each extending along the central axis AX and a cladding portion 12 covering each of the plurality of core portions 11. In the present embodiment, the preform 10A includes a pair of core portions 11. The pair of core portions 11 are arranged at positions point-symmetrical to each other with respect to the central axis AX in the cross section of the preform 10A.

The plurality of core portions 11 are made of silica ($SiO_2$) glass. One or more core portions 11 among the plurality of core portions 11 includes one or more alkali metal elements selected from the group of lithium, sodium, potassium, and rubidium. In the present embodiment, each core portion 11 includes an alkali metal element. When the core portion 11 made of silica glass includes alkali metal elements, viscosity of the core portion 11 is reduced and rearrangement of the glass is promoted when spinning the preform 10A. Therefore, in the obtained MCF 20A, transmission loss caused by Rayleigh scattering is reduced.

Each core portion 11 further includes a halogen element. Each core portion 11 may include only Cl (chlorine) or may include Cl and F (fluorine) as the halogen element. The halogen element is a halogen element caused by a halogen compound used to remove impurities in the preform manufacturing process and remaining in each core portion 11 or a halogen element intentionally doped. When the halogen element concentration in each core portion 11 is too low, impurities are not sufficiently removed by the halogen element in the preform manufacturing process, and thus transmission loss increases due to absorption by impurities. On the other hand, when the concentration of the halogen element is too high, a halogen compound of an alkali metal element is produced and acts as a nucleus for producing a crystal. When crystals are produced, the yield decreases due to defects in the preform stage and the transmission loss increases after fiber is formed. By setting the mass fraction (hereinafter referred to as "concentration") of the halogen element in each core portion 11 to 100 ppm or more 20000 ppm or less, MCF 20A with low transmission loss can be obtained without causing the above-described problem.

The cladding portion 12 is a common cladding portion that covers all of the plurality of core portions 11. The cladding portion 12 is made of silica glass. The cladding portion 12 includes fluorine. The cladding portion 12 has a refractive index lower than the refractive index of the core portion 11. The cladding portion 12 includes at least one low refractive index barrier portion 13. The refractive index of the low refractive index barrier portion 13 is lower than the average value of the refractive indices of the entire cladding portion 12 including the low refractive index barrier portion 13. The average value of the refractive index in the low refractive index barrier portion 13 is lower than the average value of the refractive indices of the entire cladding portion 12.

The low refractive index barrier portion 13 includes one or more alkali metal elements selected from the group consisting of lithium, sodium, potassium, and rubidium. The type of the alkali metal element included in the low refractive index barrier portion 13 may be the same as or different from the type of the alkali metal element included in the core portion 11. The alkali metal element is doped to, for example, the center of the low refractive index barrier portion 13.

The low refractive index barrier portion 13 includes a higher concentration of fluorine than the average fluorine concentration of the cladding portion 12. The addition of a high concentration of fluorine allows the refractive index of the low refractive index barrier portion 13 to be lower than in other regions of the cladding portion 12. The low refractive index barrier portion 13 is provided at a position overlapping the central axis AX in the cross section of the preform 10A. In the preform 10A, the position where the low refractive index barrier portion 13 is provided is a position that overlaps a line segment connecting the centers of two adjacent core portions 11 among the plurality of core portions 11 and does not overlap the two core portions 11 in the cross-section of the preform 10A. In the present embodiment, the cladding portion 12 includes one low refractive index barrier portion 13.

Here, the average concentration is expressed by the following equation when it is, for example, an average fluorine concentration of the cladding portion 12.

$$\frac{\int FdS}{\int dS} \quad \text{[Equation 1]}$$

In the above equation, F represents a local fluorine concentration. Integration is performed over the entire cladding portion 12. The local concentration is measured by an EPMA (Electron Probe Micro Analyzer) as a concentration at each position along a straight line passing through the base axis AX on an end surface of the preform 10A. A straight line passing through the central axis AX is set so as not to overlap the core portion 11. The conditions of measurement by EPMA are, for example, an acceleration voltage of 20 kV, a probe beam diameter of 0.5 μm or more 1 μm or less, and a measurement interval of 100 nm or less.

The average value of the relative refractive indices is a relative refractive index represented by the following equation.

$$\frac{\int \Delta n dS}{\int dS} \quad \text{[Equation 2]}$$

In the above equation, Δn represents a local relative refractive index, and is calculated by obtaining the refractive index using a commercially available measuring instrument for measuring the refractive index distribution of an optical fiber preform in a cylindrical state at the stage of a material before processing and then obtaining the ratio between the value and the refractive index of pure silica. In the case of an average value of the relative refractive indices of the entire cladding portion 12, integration is performed for the entire cladding portion 12. In the case of the average value of the relative refractive indices of the low refractive index barrier portion 13, the integration is performed for the entire low refractive index barrier portion 13.

MCF 20A is obtained by spinning preform 10A. The cross-sectional structure of the MCF 20A is similar to the cross-sectional structure of the preform 10A. That is, the MCF 20A includes a plurality of cores 21 each extending along a direction along the central axis and a cladding 22 covering each of the plurality of cores 21. The core 21 corresponds to the core portion 11. The cladding 22 corresponds to the cladding portion 12. In the present embodiment, the MCF 20A includes a pair of cores 21. The MCF 20A may further include a coating resin (not shown) provided on the outer circumferential surface of the cladding 22 after spinning.

The pair of cores 21 are arranged at positions point-symmetrical to each other with respect to the central axis AX in a cross section of the MCF 20A orthogonal to a predetermined direction (hereinafter referred to as "cross section of the MCF 20A"). The MCF 20A is an uncoupled MCF, and each of the plurality of cores 21 enables single mode transmission. In single mode transmission, the number of modes transmitted by each core 21 is one. The diameters (core diameters) of the plurality of cores 21 are, for example, equal to each other and are 8 μm or more 15 μm or less. The refractive indices (and propagation constants) of the cores 21 are, for example, equal to each other, but may be different from each other.

The efficiency with which optical power is coupled from one core to another core can be expressed using a power coupling coefficient. The power coupling coefficient is described in Non-Patent Literature 2. Non-Patent Literature 2 is incorporated herein by reference. The core interval is set such that a total sum h_total of power coupling coefficients of a specific core among the plurality of cores 21 and all the remaining cores is $2.3 \times 10^{-4}$/km or less. Here, the specific core is a core at which the total sum h_total of the power coupling coefficients becomes maximum. The core interval is defined by the shortest center-to-center spacing between two adjacent cores 21 among the plurality of cores 21 in the cross section of the MCF 20A. The core interval is, for example, 50 μm or less. The total sum h_total of the power coupling coefficients is the total sum of the efficiencies of coupling optical power from each of the remaining cores to the specific core. As the total sum h_total of the power coupling coefficients is smaller, leakage loss caused by XT from the specific core to another core is smaller.

The plurality of cores 21 are made of silica glass. At least one of the plurality of cores 21 may include at least one alkali metal element selected from the group consisting of lithium, sodium, potassium, and rubidium. In the present embodiment, each core 21 includes an alkali metal element. Thus, transmission loss caused by Rayleigh scattering of MCF 20A is reduced. Each core 21 may include one type of alkali metal element or may include two or more types of alkali metal elements.

Each core 21 may further include a halogen element. Each core 21 may include only Cl or may include Cl and F as the halogen element. The chlorine concentration in each core 21 is 100 ppm or more 15000 ppm or less. By setting the chlorine concentration in this range, transmission loss can be reduced. Each core 21 may further include a $GeO_2$. In the silica glass constituting each core 21, the concentration of $GeO_2$ is 1% or less. In general, $GeO_2$ is doped to increase the refractive index of the core, but scattering may occur due to density fluctuation. In the core made of silica glass to which $GeO_2$ is not substantially doped, scattering caused by density fluctuation of $GeO_2$ is suppressed, so that transmission loss can be suppressed. In the plurality of cores 21, for example, additive materials are the same as each other, but may be different from each other.

XT between two adjacent cores 21 among the plurality of cores 21 when light of predetermined wavelengths is propagated for a certain length is preferably, for example, −16 dB/km or less at wavelength of 1550 nm.

The cladding 22 is a common cladding that covers all of the cores 21. The cladding 22 is made of silica glass. The cladding 22 includes fluorine. The fluorine concentration in the cladding 22 is 25000 ppm or less. Thus, transmission loss can be reduced. In the configuration in which the cladding 22 includes fluorine, transmission loss in each of the plurality of cores 21 at wavelength of 1550 nm is 0.18 dB/km or less. The diameter of the cladding 22 is, for example, 124 μm or more 126 μm or less.

The cladding 22 includes a low refractive index barrier 23 corresponding to the low refractive index barrier portion 13. The low refractive index barrier 23 is provided at a position overlapping with the central axis AX in the cross section of the MCF 20A. The position where the low refractive index barrier 23 is provided is a position that overlaps with a line segment connecting the centers of two adjacent cores 21 among the plurality of cores 21 and does not overlap with the two cores 21 in the cross-section of the MCF 20A. In the present embodiment, the cladding 22 includes one low refractive index barrier 23. The diameter of the low refractive index barrier 23 is, for example, 5 μm or more 40 μm or less.

The relative refractive index of the low refractive index barrier 23 is lower than the average value of the relative refractive indices of the entire cladding 22. The relative refractive index of the low refractive index barrier 23 is, for example, at least 0.05% lower than the average value of the relative refractive indices of the entire cladding 22. Thus, the inter-core XT can be effectively reduced. The relative refractive index of the low refractive index barrier 23 may be at least 0.2% lower than the average value of the relative refractive indices of the entire cladding 22. In this case, the inter-core XT can be reduced more effectively.

The low refractive index barrier 23 includes one or more alkali metal elements selected from the group consisting of lithium, sodium, potassium, and rubidium. The average concentration of alkali metal elements in the low refractive index barrier 23 is, for example, 0.2 ppm or more 500 ppm or less.

Table 1 is a table summarizing the specifications of the four types of uncoupled MCFs according to Experimental Examples 1 to 4 that were manufactured and evaluated. Table 1 shows the number of cores, dopants other than alkali metal elements in the core, core diameter, cladding diameter, inter-core distance, the difference between the average relative refractive index of the entire cladding portion and the average relative refractive index of the low refractive index barrier portion of the preform (hereinafter referred to as average relative refractive index difference), transmission loss at wavelength of 1550 nm, effective cross-section (Aeff), cable cutoff wavelengths (λcc), inter-core XT at wavelength of 1550 nm, and presence or absence of alkali metal elements doped to the low refractive index barrier portion of the preform. The core diameter, the transmission loss, Aeff, and λcc are average values for the two cores.

TABLE 1

| | Experimental Example 1 | Experimental Example 2 | Experimental Example 3 | Experimental Example 4 |
|---|---|---|---|---|
| Number of cores | 2 | 2 | 2 | 2 |
| Dopant in core | Cl | Cl | Cl | Cl |
| Core diameter [μm] | 8.2 | 8.3 | 8.3 | 8.3 |
| Cladding diameter [μm] | 125 | 125 | 125 | 125 |
| Inter-core distance [μm] | 41 | 41 | 41 | 41 |
| Average relative refractive index difference between cladding portion and low refractive index cladding portion [%] | 0.1 | 0.3 | 0.5 | 1.0 |
| Transmission loss [dB/km] | 0.158 | 0.163 | 0.168 | 0.178 |
| Aeff [μm$^2$] | 80 | 81 | 81 | 81 |
| λcc [nm] | 1475 | 1481 | 1481 | 1481 |
| Inter-core XT [dB/100 km] | −61 | −65 | −70 | −80 |
| Presence or absence of alkali metal element doped to low refractive index cladding portion | Absence | Absence | Absence | Absence |

The uncoupled MCF according to Experimental Examples 1 to 4 was manufactured by varying the average relative refractive index difference between the cladding portion and the low refractive index barrier portion between 0.1% and 1.0% and matching the other conditions (the number of cores, dopant in core, core diameter, cladding diameter, inter-core distance, Aeff, and λcc). In any of the preforms of the uncoupled MCF according to Experimental Examples 1 to 4, the alkali metal elements were not doped to the low refractive index barrier portion.

Figure 2:
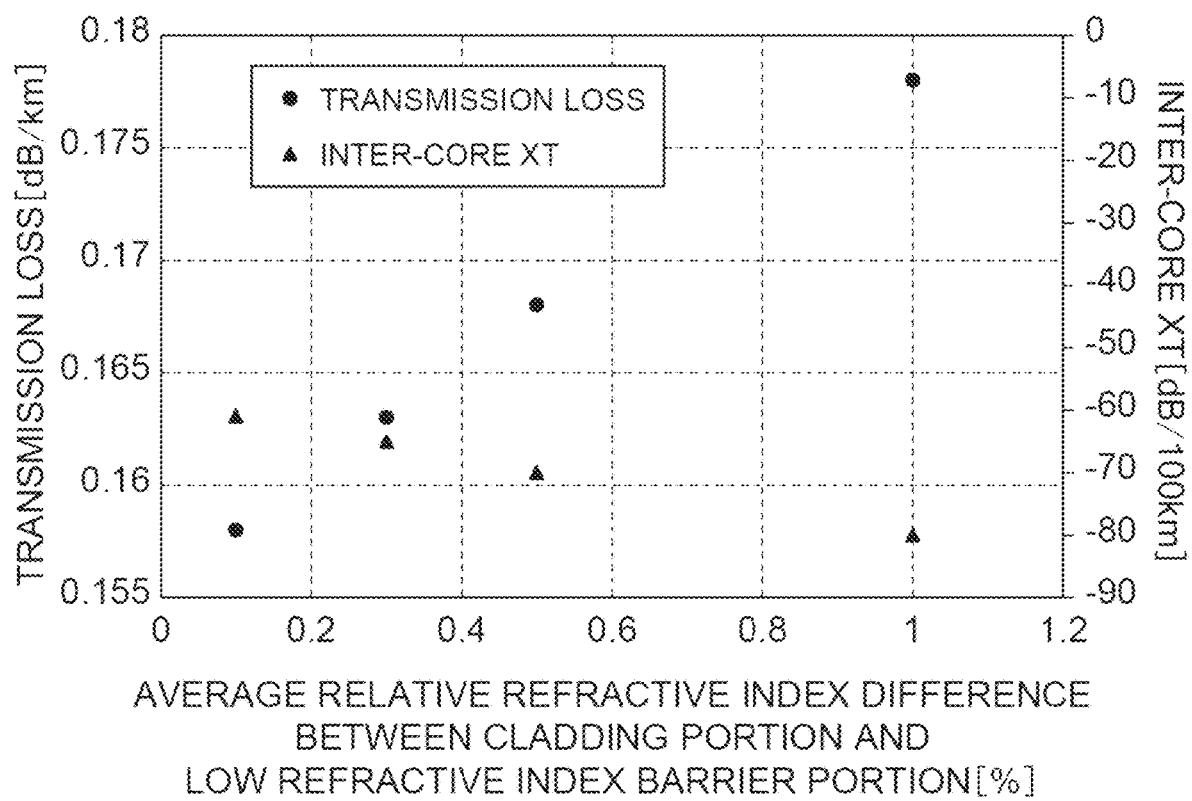
FIG. 2 is a graph showing the relationship between average relative refractive index difference, transmission loss, and inter-core XT.

FIG. 2 is a graph showing the relationship between average relative refractive index difference, transmission loss, and inter-core XT. In FIG. 2, a horizontal axis indicates an average relative refractive index difference, a left vertical axis indicates transmission loss, and a right vertical axis indicates inter-core XT. As shown in FIG. 2, it was found that as the average relative refractive index difference increases, the inter-core XT can be suppressed but the transmission loss increases.

Table 2 is a table summarizing the specifications of six types of uncoupled MCFs according to Experimental Examples 5 to 10 that were manufactured and evaluated. Table 2 shows the number of cores, dopants other than alkali metal elements in the cores, core diameter, cladding diameter, inter-core distance, transmission loss at wavelength of 1550 nm, effective areas (Aeff), cable cutoff wavelengths (λcc), inter-core XT at wavelength of 1550 nm, presence or absence of alkali metal elements doped to the low refractive index barrier portion of the preform, and the concentration of alkali metal element in the low refractive index barrier portion of the preform. The core diameter is the average value for two cores. The average relative refractive index difference between the cladding portion and the low refractive index barrier portion was set to be equal in the pairs of Experimental Examples 5 and 6, Experimental Examples 7 and 8, and Experimental Examples 9 and 10.

TABLE 2

|  | Experimental Example 5 | Experimental Example 6 | Experimental Example 7 | Experimental Example 8 | Experimental Example 9 | Experimental Example 10 |
| --- | --- | --- | --- | --- | --- | --- |
| Number of cores | 2 | 2 | 2 | 2 | 2 | 2 |
| Dopant in core | Cl | Cl | Cl, F, K | Cl, F, K | Ge | Ge |
| Core diameter [μm] | 8.2 | 8.3 | 8.2 | 8.3 | 8.2 | 8.3 |
| Cladding diameter [μm] | 125 | 125 | 125 | 125 | 125 | 125 |
| Inter-core distance [μm] | 41 | 41 | 44 | 44 | 45 | 45 |
| Transmission loss [dB/km] | 0.163 | 0.158 | 0.152 | 0.147 | 0.181 | 0.178 |
| Aeff [μm$^2$] | 80 | 81 | 83 | 82 | 81 | 81 |
| λcc [nm] | 1475 | 1481 | 1490 | 1483 | 1498 | 1487 |
| Inter-core XT [dB/100 km] | −61 | −61 | −62 | −62 | −61 | −62 |
| Presence or absence of alkali metal element doped to low refractive index cladding portion | Absence | Presence | Absence | Presence | Absence | Presence |
| Concentration of alkali metal element in low refractive index cladding portion [ppm] | — | 35 | — | 45 | — | 40 |

In the pair of Experimental Examples 5 and 6, the dopant in the core is chlorine. In the pair of Experimental Examples 7 and 8, the dopants in the core are chlorine, fluorine, and potassium. In the pair of Experimental Examples 9 and 10, the dopant in the core is germanium. As described above, the type of dopant included in the core is different between the pair of Experimental Examples 5 and 6, the pair of Experimental Examples 7 and 8, and the pair of Experimental Examples 9 and 10. When the pairs are compared with each other, it is found that the addition of the alkali metal element to the low refractive index barrier portion can reduce the transmission loss while maintaining the inter-core XT value.

Figure 3:
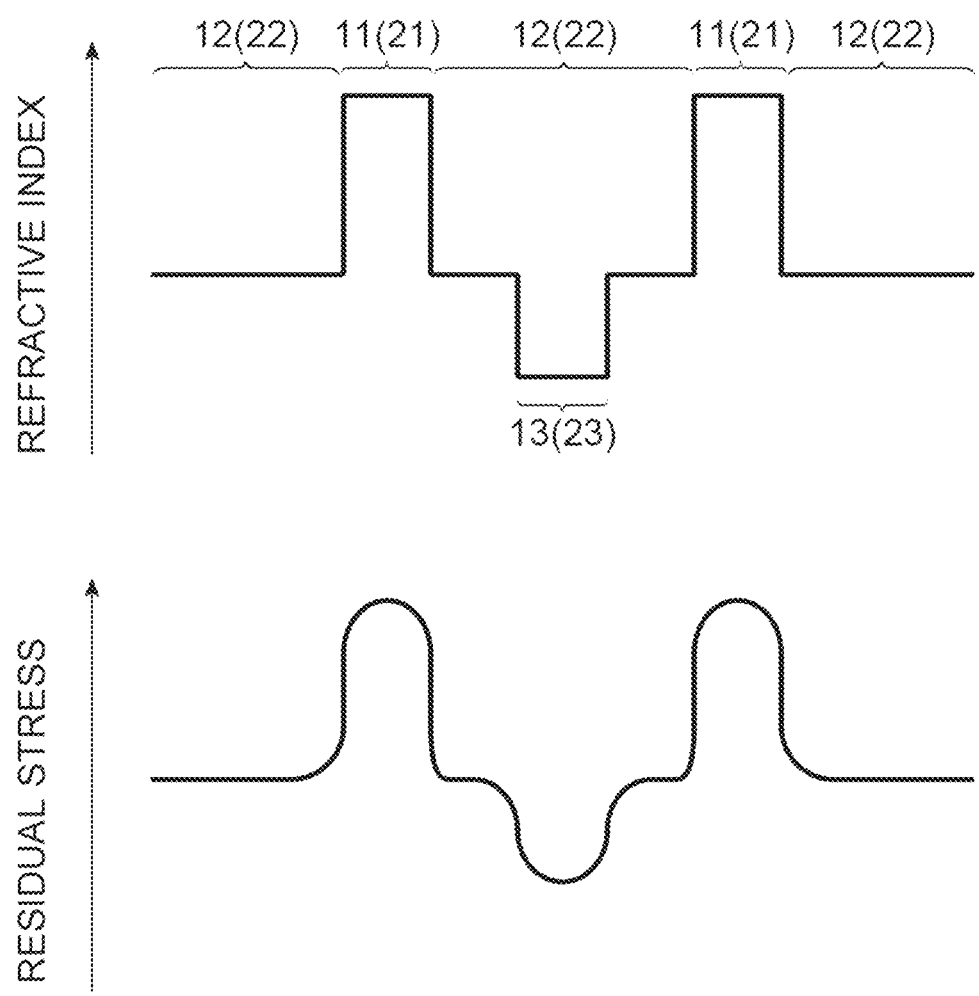
FIG. 3 is a graph showing refractive index distribution and residual stress distribution when an alkali metal element was not doped to a low refractive index barrier portion.
Figure 4:
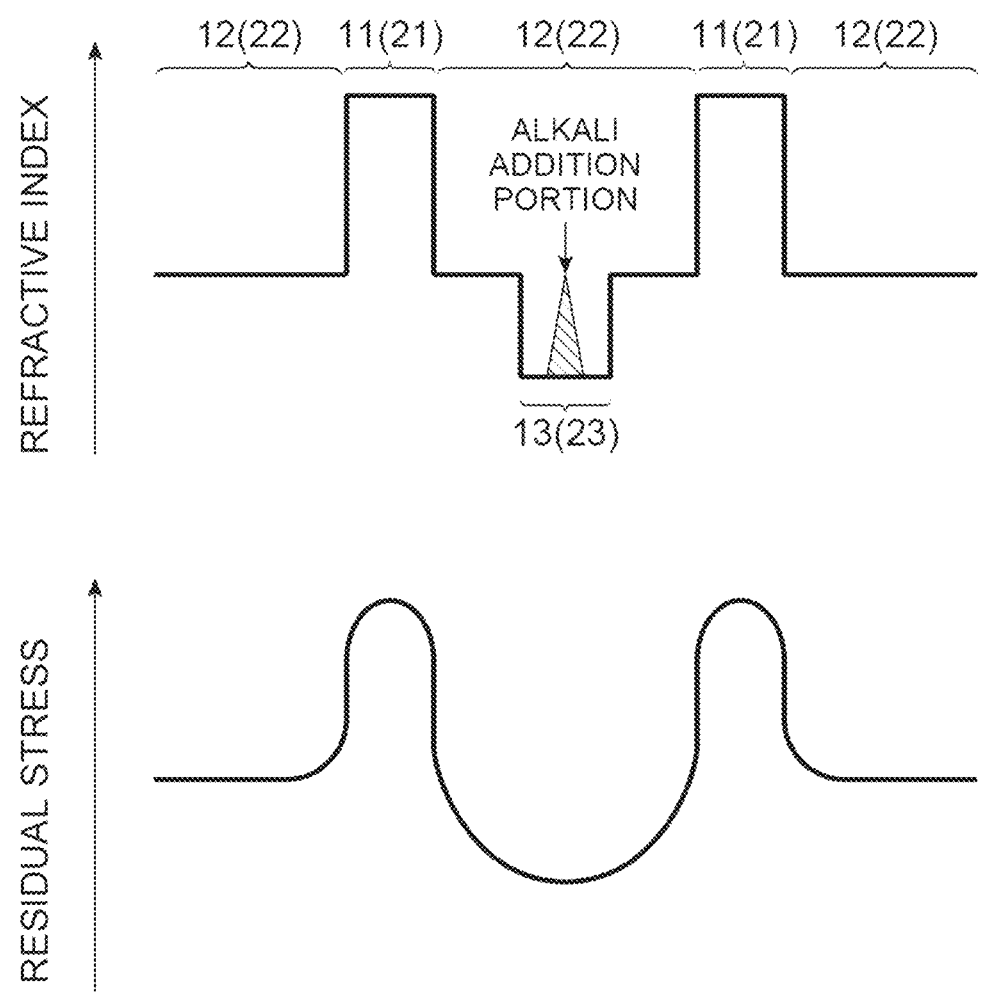
FIG. 4 is a graph showing a refractive index distribution and a residual stress distribution when an alkali metal element was doped to a low refractive index barrier portion.

With reference to FIGS. 3 and 4, a description will be given of a difference depending on whether or not an alkali metal element is doped to the low refractive index barrier portion 13. FIG. 3 is a graph showing refractive index distribution and residual stress distribution when an alkali metal element was not doped to a low refractive index barrier portion as in Experimental Examples 5, 7, and 9. FIG. 4 is a graph showing a refractive index distribution and a residual stress distribution when an alkali metal element was doped to a low refractive index barrier portion as in Experimental Examples 6, 8, and 10. In FIGS. 3 and 4, the refractive index distribution is the refractive index distribution of the preform, and the residual stress distribution is the residual stress distribution of the MCF. The alkali addition portion shown in FIG. 4 is a portion of the low refractive index barrier portion to which an alkali metal element is doped. In FIG. 4, the height of the alkali addition portion corresponds to the concentration of the alkali metal element. Although not shown in FIG. 4, an alkali metal element is also doped to the core portion.

When no alkali metal element is doped, as shown in FIG. 3, there is a difference in refractive index between the low refractive index barrier portion 13 and the cladding portion 12. This difference in refractive index is due to the difference in fluorine concentration between the low refractive index barrier portion 13 and the cladding portion 12. The difference in fluorine concentration results in a difference in viscosity between the low refractive index barrier portion 13 and the cladding portion 12 during drawing of the preform. In the MCF obtained by drawing, a difference in residual stress occurs between the low refractive index barrier and the surrounding cladding due to the influence of the difference in viscosity. As a result, the transmission loss of the MCF increases.

Even when the alkali metal element is doped, as shown in FIG. 4, a difference in refractive index due to a difference in fluorine concentration is generated between the low refractive index barrier portion 13 and the cladding portion 12. However, in this case, an alkali metal element having a viscosity-reducing effect is doped to the low refractive index barrier portion 13. The alkali metal elements spread to the low refractive index barrier portion 13 and the cladding portion 12 around the low refractive index barrier portion 13 when the preform is drawn, and suppress the difference in viscosity due to the difference in fluorine concentration. As a result, a difference in residual stress in the MCF is suppressed, and an increase in transmission loss is suppressed.

As described above, in the MCF 20A, the low refractive index barrier 23 includes alkali metal element. The alkali metal element has an effect of reducing viscosity during drawing. Therefore, formation of a residual stress difference due to a viscosity difference during drawing between the low refractive index barrier 23 and the cladding 22 around the low refractive index barrier 23 is suppressed. As a result, it is possible to achieve both reduction in inter-core XT and reduction in transmission loss.

Although the embodiments have been described above, the present invention is not necessarily limited to the above-described embodiments, and various modifications can be made without departing from the scope of the present invention.

Figure 5:
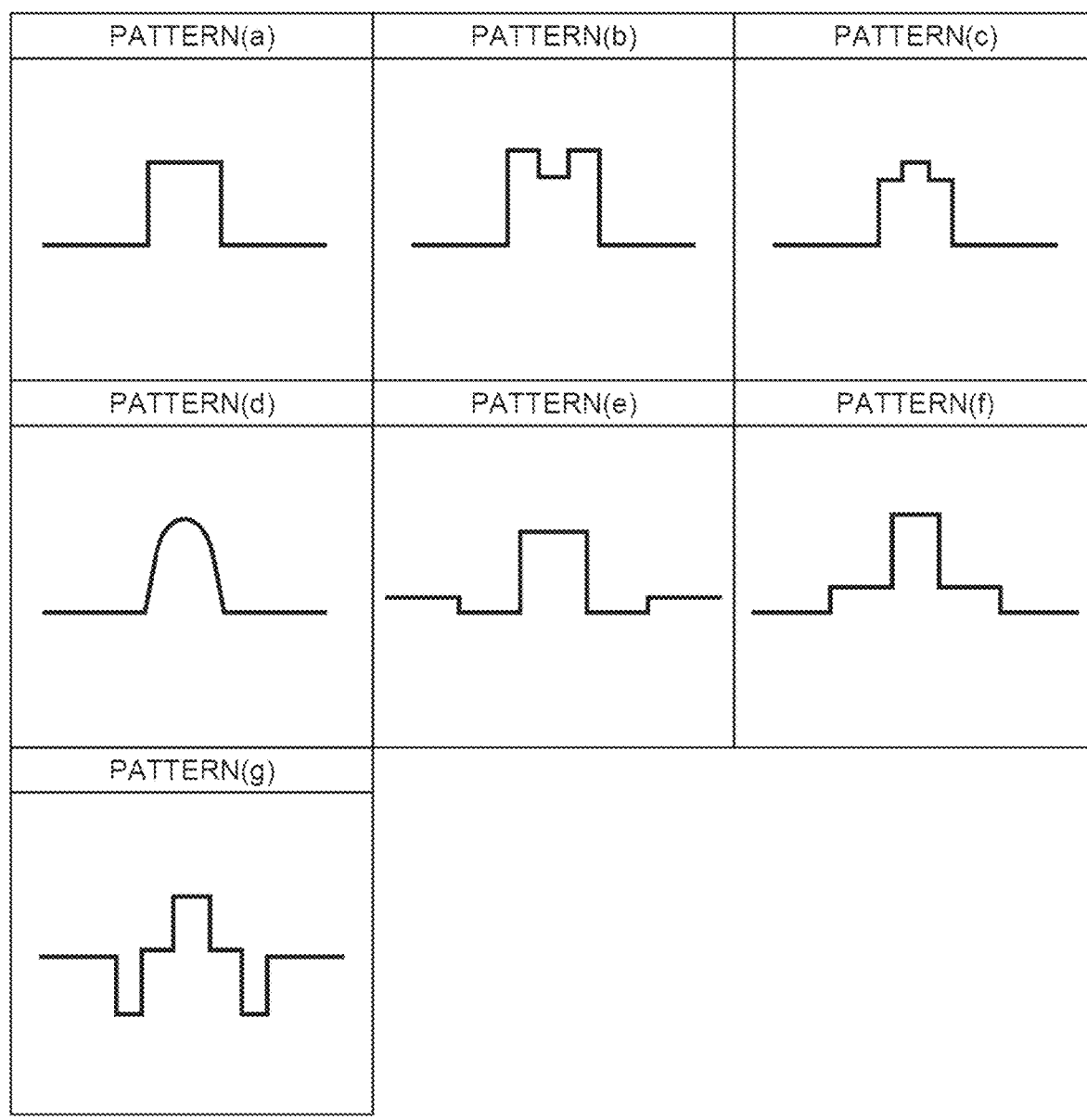
FIG. 5 is a diagram showing various refractive index distributions applicable to a region including a core and a part of cladding around the core.

FIG. 5 is a diagram showing various refractive index distributions applicable to a region R including the core 21 and a part of the cladding 22 around the core 21. As shown in FIG. 5, various refractive index distributions can be applied to the region R (see FIG. 1). As for the refractive index distribution of each core 21, an appropriate structure can be selected according to the application. The core 21 may have a uniform structure or may have different structures. There is no limit to the number of cores 21 in the cross-section of the MCF 20A. Depending on the number of cores 21 to be accommodated, glass diameter (diameter of cladding) of the MCF 20A and outer diameter of coating resin provided on outer circumferential surface of the cladding 22 may be appropriately set.

Specifically, as the shape of the refractive index distribution of the region R including each core 21, any of a step type (pattern (a) shown in FIG. 5), a ring type (pattern (b) shown in FIG. 5), a double step type (pattern (c) shown in FIG. 5), a graded type (pattern (d) shown in FIG. 5), and the like can be applied to the region corresponding to the core 21. Further, any of the step type (pattern (a) shown in FIG. 5), a depressed type (pattern (e) shown in FIG. 5), a convex type (pattern (f) shown in FIG. 5), a trench type (pattern (g) shown in FIG. 5) and the like can be applied to the region corresponding to the cladding 22.

Figure 6:
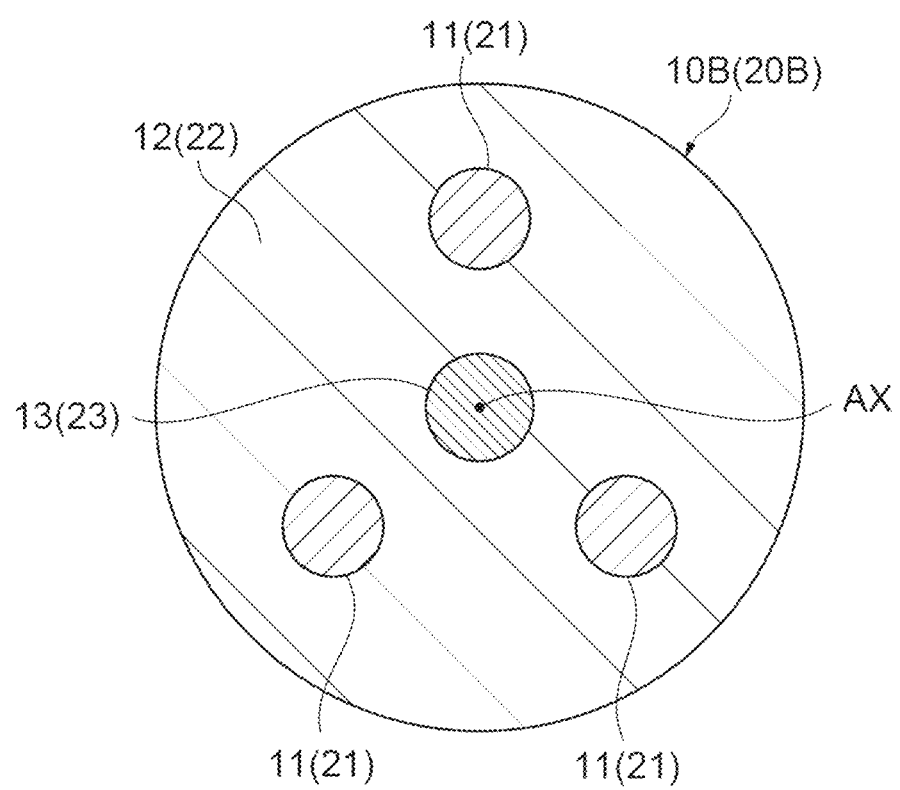
FIG. 6 is a diagram showing a cross-sectional structure of an MCF according to a first modification and a cross-sectional structure of a preform for manufacturing the MCF.

FIG. 6 is a diagram showing a cross-sectional structure of an MCF 20B according to a first modification and a cross-sectional structure of the preform 10B for manufacturing the MCF 20B. As shown in FIG. 6, the preform 10B according to the first modification is different from the preform 10A in that three core portions 11 are provided. The plurality of core portions 11 are arranged at equal intervals on the circumference of a circle centered on the central axis AX, for example. The MCF 20B according to first modification is different from the MCF 20A in that three cores 21 are provided. The refractive indices (and propagation constants) of the cores 21 are, for example, equal to each other, but may be different from each other.

Figure 7:
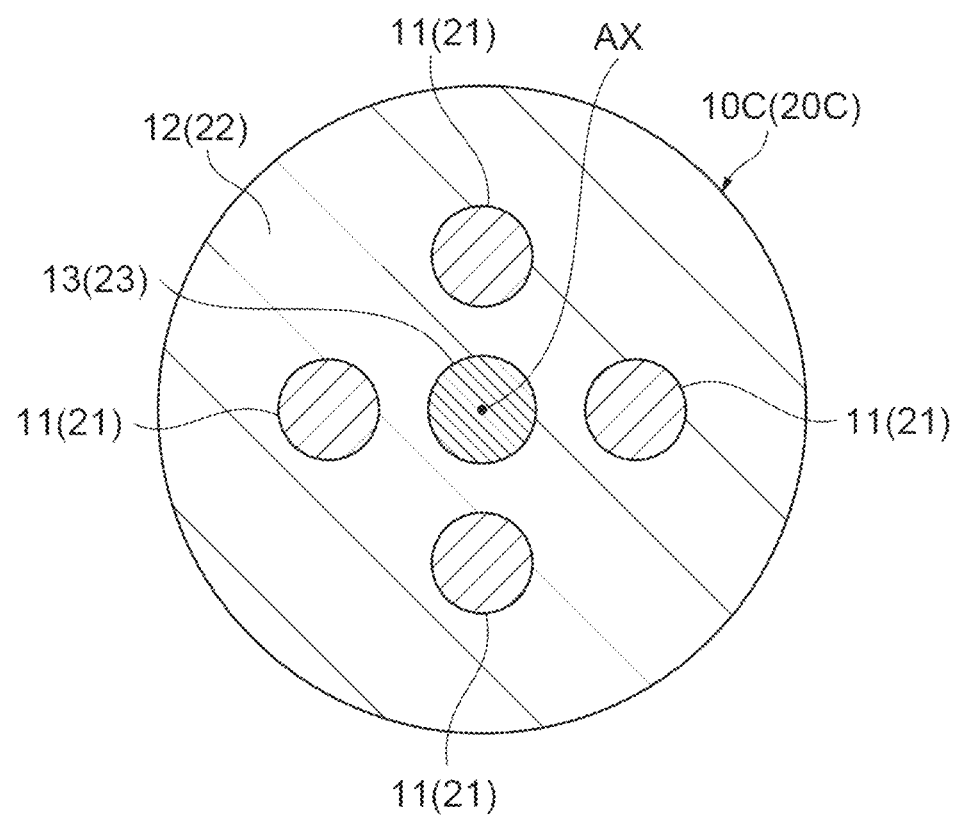
FIG. 7 is a diagram showing a cross-sectional structure of an MCF according to a second modification and a cross-sectional structure of a preform for manufacturing the MCF.

FIG. 7 is a diagram showing a cross-sectional structure of an MCF 20C according to a second modification and a cross-sectional structure of a preform 10C for manufacturing the MCF 20C. As illustrated in FIG. 7, the preform 10C according to the second modification is different from the preform 10A in that four core portions 11 are provided. The plurality of core portions 11 are arranged at equal intervals on the circumference of a circle centered on the central axis AX, for example. The MCF 20C according to the second modification is different from the MCF 20A in that four cores 21 are provided. The refractive indices of the cores 21 are, for example, equal to each other, but may be different from each other. For example, the refractive indices of two cores 21 facing each other via the central axis AX among the four cores 21 may be different from the refractive indices of the remaining two cores 21.

The number of the core portions 11 and the cores 21 may be each five or more. In addition, the cladding portion 12 may include an inner cladding portion covering all of the plurality of core portions 11 and an outer cladding portion surrounding the inner cladding portion. In this case, the cladding 22 includes an inner cladding corresponding to the inner cladding portion and an outer cladding corresponding to the outer cladding portion.

REFERENCE SIGNS LIST 10A, 10B, 10C preform
11 core portion
12 cladding portion
13 low refractive index barrier portion
20A, 20B, 20C MCF
21 core
22 cladding
23 low refractive index barrier
AX central axis
R region including the core 21 and a part of the cladding 22 around the core 21

The invention claimed is:

1. A multicore optical fiber comprising:
a plurality of cores each extending in a direction along a central axis;
a low refractive index barrier including an alkali metal element; and
a cladding covering each of the plurality of cores,
wherein the low refractive index barrier is positioned within the cladding, and the low refractive index barrier has a relative refractive index lower than an average value of relative refractive indices of the cladding overall, and
a core interval is set such that a total sum of power coupling coefficients between a specific core among the plurality of cores and each of all remaining cores is $2.3 \times 10^{-4}$/km or less.

2. The multicore optical fiber according to claim 1, wherein the low refractive index barrier is provided at a position overlapping a center of the cladding in a cross section orthogonal to a direction along the central axis.

3. The multicore optical fiber according to claim 1, wherein the low refractive index barrier is provided at a position overlapping a line segment connecting centers of two cores adjacent to each other among the plurality of cores and not overlapping the two cores in a cross section orthogonal to a direction along the central axis.

4. The multicore optical fiber according to claim 1, wherein the core interval is 50 μm or less.

5. The multicore optical fiber according to claim 1, wherein the relative refractive index of the low refractive index barrier is at least 0.05% lower than the average value of the relative refractive indices of the cladding overall.

6. The multicore optical fiber according to claim 1, wherein the relative refractive index of the low refractive index barrier is at least 0.2% lower than the average value of the relative refractive indices of the cladding overall.

7. The multicore optical fiber according to claim 1, wherein one or more cores of the plurality of cores include an alkali metal element.

8. The multicore optical fiber according to claim 1, wherein an average mass fraction of alkali metal elements in the low refractive index barrier is 0.2 ppm or more 500 ppm or less.

9. The multicore optical fiber according to claim 1, wherein the low refractive index barrier includes at least one alkali metal element selected from the group consisting of lithium, sodium, potassium, and rubidium.

10. The multicore optical fiber according to claim 1, wherein each of the plurality of cores is made of $SiO_2$ glass in which a mass fraction of $GeO_2$ is 1% or less,
the cladding includes fluorine, and
a transmission loss of each of the plurality of cores at wavelength of 1550 nm is 0.18 dB/km or less.

11. The multicore optical fiber of claim 10, wherein the mass fraction of fluorine in the cladding is 25000 ppm or less.

12. The multicore optical fiber according to claim 1, wherein a diameter of each of the plurality of cores is 8 μm or more 15 μm or less.

13. The multicore optical fiber according to claim 1, wherein a diameter of the low refractive index barrier is 5 µm or more 40 µm or less.

14. The multicore optical fiber according to claim 1, wherein one or more cores of the plurality of cores include a halogen element.

15. The multicore optical fiber according to claim 1, wherein crosstalk between two adjacent cores among the plurality of cores is −16 dB/km or less at wavelength of 1550 nm.

16. The multicore optical fiber according to claim 7, wherein the alkali metal element included in the one or more cores of the plurality of cores is different than the alkali metal element included in the low refractive index barrier.

17. The multicore optical fiber according to claim 7, wherein the alkali metal element included in the one or more cores of the plurality of cores is the same as the alkali metal element included in the low refractive index barrier.

18. The multicore optical fiber according to claim 1, wherein the low refractive index barrier includes a higher concentration of fluorine than an average fluorine concentration of the cladding portion.

\* \* \* \* \*